United States Patent [19]
Perkins

[11] 3,843,592
[45] Oct. 22, 1974

[54] FIRE RESISTANT POLYCHLOROPRENE ADHESIVE

[75] Inventor: Garry R. Perkins, Palatine, Ill.

[73] Assignee: Spotnails, Inc., Rolling Meadows, Ill.

[22] Filed: May 7, 1973

[21] Appl. No.: 358,201

Related U.S. Application Data

[63] Continuation-in-part of Ser. No. 197,949, Nov. 11, 1971.

[52] U.S. Cl. ......... 260/38, 260/32.8 A, 260/45.7 S, 260/41.5 A
[51] Int. Cl. ............................................. C08g 51/04
[58] Field of Search............ 260/32.8 A, 33.6 A, 38, 260/41.5 A, 45.7 S, 47.7 SN

[56] References Cited
UNITED STATES PATENTS

| | | | |
|---|---|---|---|
| 2,918,442 | 12/1909 | Gerrard | 260/293 |
| 3,488,315 | 1/1970 | Slucker | 260/33.6 |
| 3,500,603 | 4/1970 | Strack | 260/41.5 A X |
| 3,532,660 | 10/1970 | Ott | 260/31.2 |
| 3,538,047 | 1/1951 | Sanders | 260/45.75 |

*Primary Examiner*—Morris Liebman
*Assistant Examiner*—S. M. Person
*Attorney, Agent, or Firm*—Neuman, Williams, Anderson & Olson

[57] ABSTRACT

A novel self-curing polychloroprene base adhesive composition is provided which exhibits unexpectedly superior resistance to fire and high temperature conditions, shows reduced staining properties, exhibits good shelf life and is especially useful in the building construction field in lieu of traditional fasteners such as nails, screws and the like. The composition contains polychloroprene elastomer, asbestos, a combination of heat advancing oil soluble phenolic resins, non-staining antioxidants and fillers. The novel properties of this composition are achieved by a process which includes forming a solvent solution of the phenolic resin which is admixed with magnesium or cadmium oxide. This mixture is held for a period of time for pre-reaction, preferably at least two weeks, or more, although shorter times will suffice. A separate admixture of neoprene, magnesium or cadmium oxide, zinc oxide, antioxidants and asbestos is formed and is thoroughly admixed in the dry state below 140°F. The two admixtures are blended for a period of about eight hours or more to provide a high viscosity composition and solvents are added to the mixed composition to reduce the viscosity to from about 23,000 to about 90,000 centipoises.

9 Claims, No Drawings

FIRE RESISTANT POLYCHLOROPRENE ADHESIVE

CROSS REFERENCE TO RELATED APPLICATIONS

This application is a Continuation-in-Part of application Ser. No. 197,949, filed Nov. 11, 1971.

BACKGROUND OF THE INVENTION

1. Field of the Invention

This invention relates to fire resistant neoprene based adhesives and cements which exhibit low staining characteristics, self-curing, good wet bonding to wood and extended shelf life.

2. Description of the Prior Art

Polychloroprene based adhesives and cements which display heat curing characteristics are not new to the art. Such adhesives, for example, are disclosed in Thompson, U.S. Pat. No. 2,610,910 and Clawson, et al., U.S. Pat. No. 2,918,440. The Thompson patent discloses a neoprene based adhesive which is self-curing at room temperature or on the application of heat. These adhesives, however, show substantial staining liability and, moreover, do not pass the Forest Product Laboratories of the U.S. Department of Agriculture fire tests and do not show good adhesion and bonding properties to wet or frozen surfaces, which are frequently encountered in building construction work. These compositions furthermore do not have the extreme weather resistance required for construction which is exposed to the elements. It is also noted that the prior art frequently requires the introduction of water which frequently results in additional staining hazards and contributes to poor bonding to wet or frozen surfaces at low temperatures.

SUMMARY OF THE INVENTION

The present invention relates to neoprene adhesive compositions which contain a polychloroprene elastomer, asbestos, heat advancing oil soluble phenolic resins, a combination of antioxidants comprising dialkyl thiodipropionates and nickel dibutyl dithiocarbamate, magnesium oxide or cadmium oxide, and zinc oxide suspended in an appropriate solvent.

The composition described above may contain on a percentage basis from as low as 20 percent to as much as 80 percent polychloroprene elastomer, preferably from about 45 percent to 65 percent of said polychloroprene elastomer. It should be understood that polychloroprene refers to products sold as neoprene type materials, especially soft grain neoprene sold by the DuPont Corporation as AD or AC neoprenes. It should also be understood that the percentages given, unless otherwise indicated, are on a dry solids weight percent basis.

In these compositions, the phenolic resin employed may be a single fast-acting resin, but preferably is a combination of fast and slow acting phenolic resins which are frequently described as heat advancing and oil soluble. These resins are customarily formed by polymerization of parasubstituted phenols and formaldehyde. Generally, the phenols described as resin starting materials in the Thompson patent are suitable for this purpose. The so-called fast acting or fast curing phenolic resins may be further characterized by their thermal stability in the adhesive. Thus, for example, the fastest acting types are stable at 500°F. and above. This may be exemplified by Schenectady Chemical Co. phenolic resin SP-174.

Intermediate and slow acting or curing phenolic resins are those having thermal stability at temperatures up to 400°F. are exemplified by Schenectady Chemical Co. SP-154, stable to about 380°-400°F. and SP-134, stable to about 300°-350°F. Another typical slow acting or curing resin is Bakelite CKR-1634 made by Union Carbide Co. and has thermal stability up to about 350°F. The phenolic resin is incorporated in the admixture in amounts ranging from about 15 to 50 percent, preferably from about 20 to 35 percent. Phenolics incorporated are as indicated, fast acting or fast curing materials, or may be a combination of fast acting or fast curing materials with slower curing phenolics, but generally the fast curing should be present as at least 20 percent by weight of the phenolic resin component, preferably 30 to 100 percent thereof.

The asbestos is employed in amounts ranging from 1 to 50 percent of said composition, preferably from 1 to 10 percent by weight. The cadmium oxide or magnesium oxide or mixtures thereof is employed in these compositions in amounts of from 2 to 20 percent, preferably from 2 to 10 percent. Cadmium oxide provides enhanced heat resistance in the final adhesive compositions.

Zinc oxide is incorporated in amounts of from 1 to 15 percent, from 1 to 10 percent by weight.

Fillers may be employed in these compositions in amounts from 0 to 50 percent by weight thereof and may include calcium silicates (hydrated or otherwise) fiberglass chop, powdered glass, clays such as Bentonite and Montmorillonite, aluminate silicate, ash, talc, carbon black, calcium carbonate and magnesium carbonate. These fillers may be incorporated either as extenders or reinforcing agents. Generally, the addition of fillers will provide increased shear resistance or resistance to creep of the applied adhesive.

The antioxidants dialkyl thiodipropionate and nickel dibutyl dithiocarbamate employed in combination appear to provide a dual function of preventing staining, deterioration of the adhesive, premature curing and eliminating solvent separation from the final combination. The use of these antioxidants reduces the phasing (premature curing) customarily found in neoprene cements and adhesives. The thiodipropionate antioxidants have the formula:

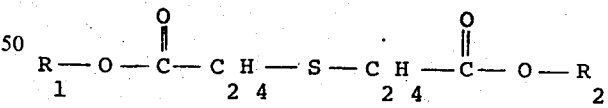

wherein $R_1$ and $R_2$ are alkyl or isoalkyl radicals of from 9 to 20 carbon atoms. The most preferred is dilauryl thiodipropionate. The dialkyl thiodipropionate and nickel dibutyl dithiocarbamate antioxidants are generally employed in equal amounts and each may be employed in amounts of 0.1 to 2 percent by weight, although most preferably they are each employed at about 0.5 percent by weight.

The novel process employed in preparing the composition of the present invention contributes to the attainment of the unusual physical properties exhibited by the adhesive or cement described above. Generally, the process may be described as a three-step procedure involving the following:

STEP A:

Phenolic resin is blended with an organic solvent and a portion of the magnesium or cadmium oxide. Approximately one-half of the magnesium or cadmium oxide is employed in forming the composition of Step A. The degree of agitation is such as to provide full dispersion of the solid components. To permit adequate pre-reaction, periods of time of from at least 2 to 6 hours are necessary but preferably extended periods of reaction such as about 2 weeks give the best and most uniform results.

STEP B:

The neoprene (polychloroprene) elastomer is blended with the remainder of the magnesium or cadmium oxide, antioxidants, fillers and asbestos in conventional high shear rubber mixing equipment (such as a mill or Banbury) followed by dissolution of the solid admixture in an organic solvent or solvent composition.

STEP C:

The products obtained from Steps A and B are blended together in a mixer and zinc oxide is then added. If desired, all or a part of the zinc oxide can be added in Step B to reduce scorch. The compositions A and B are thoroughly mixed at a temperature below about 140°F., preferably below about 120°F. for a period of at least about 2 hours but for most uniform product and best bond, preferably about 8 hours. The high viscosity mixture is then reduced in viscosity by the further addition of solvents to produce a material having a viscosity of from 23,000 to about 90,000 centipoises and then placed into containers. For the traditional cartridge type container such as are ordinarily employed in caulking gun-type devices which are suitable for applying a predetermined strip or bead of adhesive, viscosities should be between about 48,000 to about 70,000. For carpet adhesives, the viscosity may run as low as about 23,000 up to about 35,000 to 48,000 centipoises. This could also be used to cement a vinyl top to a car. A paste type cement suitable for troweling can have viscosities up to 90,000 centipoises.

If desired, very rapid cures may be obtained by the incorporation of accelerators such as NA 101 which provides a rapid cure at 150° to 200°F. but only at these elevated temperatures, thereby avoiding premature curing during storage. These temperatures would be encountered in roof deck installations.

The solvents which are employed in the present compositions are generally aromatic and ketone solvents such as toluene, xylene, methylethylketone and and acetone. Hexane and other aliphatics may also be used. The various properties of these solvents may be adjusted to produce the solvation characteristics desired. Accordingly, the compositions described above are well adapted for the bonding of wood, plywood, steel, rubber, aluminum, plastic, concrete, plasterboard, or the like in any combination. They display high initial bonding strength and tack, which bonding strength is increased with time, reaching high bond levels in about 5 to 7 days, the ultimate or plateau bonding levels or strengths being achieved in about 28 days. The compositions are also extremely resistant to high temperature conditions and fire, being able to pass the U.S. Department of Agriculture, Forest Product Laboratories fire test which requires the ability to withstand direct flame impingement on an exterior plywood member that is adhesively bonded to a wood structure without reducing the bond strength until the entire outer bonded plywood member is burned away. This test involves temperatures on the order of 250°F. to 425°F. above room temperature.

Further objectives achieved by the employment of the adhesive compositions of the present invention are low staining characteristics, resistance to phase changes, and high resistance to weathering and oxygen bomb aging.

A further important object is the provision of an adhesive composition which shows outstanding bonding to wet and frozen surfaces.

A still further object is the provision of highly heat resistant fire proof mastics at relatively low cost.

A still further object is the provision of an adhesive mastic composition which has good storage stability characteristics when stored or shipped under high temperature conditions such as warehouses, trucks, boxcars and the like.

A still further object is the provision of high performance adhesive compositions which do not require the addition of water to achieve good curing properties.

A still further object is the provision of adhesive compositions which are non-thixotropic and are readily applied at low temperatures.

DESCRIPTION OF THE PREFERRED EMBODIMENTS

The following specific examples will illustrate compositions prepared in accordance with procedures of the present invention:

EXAMPLE I

An adhesive was prepared employing polychloroprene, phenolic resins, asbestos, antioxidants and fillers having the following composition in the weight percent portions listed below:

| Parts or % | |
|---|---|
| 44 | CHLOROPRENE (SOFT GRAIN, DuPONT TYPE AC NEOPRENE) |
| 22 | HEAT REACTIVE ALKYLPHENOLIC RESINS 8% (CKR NO. 1634) 8% (SP-174) 6% (SP-154) |
| 10 | HARD CLAY |
| 6 | HYDRATED CALCIUM SILICATE |
| 6% | ASBESTOS (CHOPPED FIBER) |
| 5% | MAGNESIUM OXIDE |
| 3.5% | ZINC OXIDE |
| 2% | HEAT RESISTANT ACCELERATOR (NA101) |
| 0.5% | PHENYL-ALPHA-NAPHTHYLAMINE |
| 0.5% | NICKEL DIBUTYL DITHIOCARBAMATE |
| 0.5% | DILAURYL THIODIPROPIONATE |

The foregoing materials are mixed in the following sequence procedure.

STEP A:

The phenolic resins are combined and mixed with an equal amount of hexane followed by addition of one-half of the magnesium oxide (or cadmium oxide, if employed). The composition is agitated for a period of 4 to 6 hours to assure full dispersal of the solid components. The admixture is preferably permitted to pre-react for an additional period of up to 2 weeks or more for best results.

STEP B:

The neoprene elastomer is dry milled for a period of 5 minutes on a rubber mill, after which period the remainder of the magnesium and the anit-oxidants are blended in, followed by another one or 2 minutes of mixing. Further additions of hydrated calcium silicate and asbestos are made to the mixture followed by further milling or mixing for a period of from about 10 minutes to assure complete dispersion. In this speciifc embodiment a Banbury was employed. The rubber or neoprene material is then diced and reduced with toluene until the mixture is smooth. The accelerator is then added to the solvent-reduced elastomer and blended for a period of 1 hour. The zinc oxide is also added at this time, although it can be added to the rubber in the milling step.

STEP C:

The compositions resulting from steps A and B are blended and admixed for a period of 8 hours and then reduced to the desired viscosity (in this instance 52,000 centipoises) with a solvent admixture comprising:
40 percent Hexane
30 percent Toluene
20 percent Methyl-ethylketone
10 percent Acetone The final product is packaged into cartridges.

EXAMPLE II

An adhesive composition having the following components was prepared following the procedure set forth in Example I:

| Parts by Weight or Percent by Weight | |
|---|---|
| 54 | DU PONT AD NEOPRENE (SOFT GRAIN) |
| 10 | PHENOLIC RESIN, TYPE CKR NO. 1634 (BAKELITE) (UNION CARBIDE COMPANY) |
| 10 | PHENOLIC RESIN, TYPE SP-154 |
| 8 | HYDRATED CALCIUM SILICATE |
| 7 | PHENOLIC RESIN, TYPE SP-174 |
| 5 | MAGNESIUM OXIDE |
| 3 | ZINC OXIDE |
| 1.5% | ASBESTOS FIBER |
| 0.5% | ANTIOXIDANT (PHENYL-ALPHA-NAPTHYLAMINE) |
| 0.5% | DILAURYL THIODIPROPIONATE |
| 0.5% | NICKEL DIBUTYL DITHIOCARBAMATE |
| TOTAL 100% | |

The final composition was reduced to a viscosity of about 55,000 centipoises using the same solvent blend.

EXAMPLE III

An adhesive composition was prepared following the procedure of Example I employing the following components in the indicated proportions:

| Parts or % | |
|---|---|
| 48 | CHLOROPRENE (SOFT GRAIN, DU PONT TYPE AC NEOPRENE) |
| 18 | HEAT-REACTIVE ALKYLPHENOLIC RESINS 6% (CKR NO. 1634)(BAKELITE-UNION CARBIDE) 8% (SP-174)(SCHENECTADY CHEM. CO.) 4% (SP-154)(SCHENECTADY CHEM. CO.) |
| 10 | HARD CLAY |
| 8 | HYDRATED CALCIUM SILICATE |
| 6% | ASBESTOS (CHOPPED FIBER) |
| 5 | MAGNESIUM OXIDE |
| 3.5 | ZINC OXIDE |
| 0.5% | PHENYL-ALPHA-NAPHTHYLAMINE |
| 0.5% | NICKEL DIBUTYL DITHIOCARBAMATE |
| 0.5% | DILAURYL THIODIPROPIONATE |

EXAMPLE IV

An adhesive composition having the following components was prepared following the procedure set forth in Example I:

| Parts by weight or Percent by weight | |
|---|---|
| 58 | DU PONT AD NEOPRENE (SOFT GRAIN) |
| 8 | PHENOLIC RESIN, TYPE CKR NO. 1634 (BAKELITE)(UNION CARBIDE COMPANY) |
| 8 | PHENOLIC RESIN, TYPE SP-154 (SCHENECTADY CHEMICAL) |
| 8 | HYDRATED CALCIUM SILICATE |
| 7 | PHENOLIC RESIN, TYPE SP-174 (SCHENECTADY CHEMICAL) |
| 5 | MAGNESIUM OXIDE |
| 3 | ZINC OXIDE |
| 1.5% | ASBESTOS FIBER |
| 0.5% | ANTIOXIDANT (PHENYL-ALPHA-NAPTHYLAMINE) |
| 0.5% | DILAURYL THIODIPROPIONATE |
| 0.5% | NICKEL DIBUTYL DITHIOCARBAMATE |
| TOTAL 100% | |

EXAMPLE V

An adhesive composition having the following components was prepared by following the procedure set forth in Example I:

| Parts by Weight or Percent by Weight | |
|---|---|
| 54 | DU PONT AD NEOPRENE (SOFT GRAIN) |
| 10 | PHENOLIC RESIN, TYPE CKR No. 1634 (BAKELITE BRAND, UNION CARBIDE CO.) |
| 10 | PHENOLIC RESIN, TYPE SP-154 (SCHENECTADY CHEMICAL) |
| 8 | HYDRATED CALCIUM SILICATE |
| 7 | PHENOLIC RESIN, TYPE SP-174 (SCHENECTADY CHEMICAL) |
| 5 | CADMIUM OXIDE |

| Parts by Weight or Percent by Weight | |
|---|---|
| 3 | ZINC OXIDE |
| 1.5% | ASBESTOS FIBER |
| 0.5% | ANTIOXIDANT (PHENYL-ALPHA-NAPTHYLAMINE) |
| 0.5% | DILAURYL THIODIPROPIONATE |
| 0.5% | NICKEL DIBUTYL DITHIOCARBAMATE |
| TOTAL 100% | |

The foregoing compositions were tested by Government certified laboratories by the procedures used by the American Plywood Association Adhesives for Field-Gluing Plywood to Wood Framing (May 1971) and FHA Bulletin UM-60.

The test samples were prepared in accordance with APA AFG-10. The following results were obtained:

TABLE I

| TEST | SHEAR STRENGTH Load in Pounds | FHA-APA AFG-01 Minimum Standard Requirements Lbs. |
|---|---|---|
| Wet Lumber (3·1·1)A | 423 | 225 |
| Frozen Lumber (3·1·1)B | 806 | 150 |
| Dry Lumber (3·1·1)C | 570 | 225 |
| Using a 1/16" Glue Line (3·1·2) | 338 | 150 |
| DURABILITY TESTS | | |
| Moisture Resistance (3·2·1·1) | 100% | 90% |
| Shear Strength (3·2·1·2) | 227 | 225 |
| Oxidation (3·2·2) | 100% | 100% |

Similar shear strength tests indicated superior results in comparative tests with various commercial adhesives now on the market. The time delay factor indicates the aging of the adhesive from application to test.

TABLE II

| | PRODUCT OF EXAMPLE | | SHEAR LOADS (1 of 4 tests) | | | | |
|---|---|---|---|---|---|---|---|
| | | | COMPETITIVE COMMERCIAL | | | | PRODUCTS |
| AGING | I | II | A | B | C | D | E |
| 24 hrs. | 1015 | | 429 | 168 | 383 | 296 | 418 |
| | | | F | G | H | | |
| 72 hrs. | 803 | 856 | 433 | 256 | 276 | | |
| | | | J | | | | |
| 26 days | 2178 | 1008 | 1007 | | | | |

The following data represents the results obtained from shear tests of 1 × 4 inch white pine boards using the composition of Example I with various aging times after application to the test date.

TABLE III

| DAYS OF AGING | MAX. LOAD (Ave. 10 Trials) (Lbs.) |
|---|---|
| 2 | 588 |
| 4 | 1072 |
| 5 | 1320 |
| 7 | 1329 |
| 28 | 1736 |

The adhesives of Examples I and II are also unique in that they pass the Flame Penetration Tests as described in Forest Products Laboratory Fire Tests, Report No. 1443, revised September 1959 (Reaffirmed 1965) for 20 × 20 inch plywood panels. These tests demonstrated that the adhesives were capable of withstanding the elevated temperatures of the direct flame impingement test. The test was terminated after 14–16 minutes due to plywood burning away prior to failure of the glue line. The test showed glue line temperatures (thermocouple registered) of 430°–510°F.

All of the adhesives prepared in the specific examples used dry or essentially dry or anhydrous components and it has been found that the presence of water in the admixture of component materials produces an inferior product. The test data indicates that the adhesive compositions of the present invention have outstanding physical properties which permits their use in a variety of applications including their use in building constructions as a superior replacement for more traditional fastening devices such as nails, staples, brads or the like.

These adhesives may be employed under a variety of adverse circumstances such as in areas where fire resistance is required, where low temperature application is encountered, where a variety of diverse materials are to be bonded, where wet and frozen materials are to be joined, and where the adhesive bond must have long life. The compositions described in the foregoing are fire-resistant adhesives when applied to wood or other objects and structures which are part of an element which is subjected to a fire liability. One of the problems that is encountered in application, however, is that the solvents utilized are flammable materials and that there is some flammability hazard in the application. It has been found that this fire hazard in the application stage and immediately thereafter while the adhesive is drying may be sharply reduced or eliminated by the employment of solvent systems which contain a fairly high percentage of non-flammable solvent materials which are preferably essentially non-toxic or have a low toxicity hazard. Solvents which suppress the flammability of other normally flammable materials such as hydrocarbon solvents or the like are preferred. Exemplary of these materials are methylene chloride which when used in a blend with hexane in a 40:60 ratio produces a non-flammable solvent for use in the compositions of the present invention.

The adhesives are also characterized by good storage stability under a variety of hot and cold conditions. For example, adhesives in gun-type cartridges may be shipped and stored at rather high temperature, such as encountered in a warehouse or on a truck, without thickening or gelling whereas conventional polychloroprene adhesives or cements display phasing in 30 to 90 days in storage or after application. The adhesives of the present invention on the other hand have a storage life of a year or more.

What is claimed is:

1. A process for preparing a fire resistant adhesive composition comprising on a weight percent basis: from 20 to 80 percent polychloroprene; from 15 to 50 percent heat advancing, oil soluble phenolic resin of which at least 20 percent is a resin which is thermally stable at 500°F. and above; from 1 to 50 percent asbestos; from 2 to 20 percent of an oxide selected from the group consisting of magnesium and cadmium oxide; from 0 to 50 percent fillers; and from 0.1 to 2 percent each of a dialkyl thiodipropionate and a nickel dibutyl dithiocarbamate antioxidant, said process comprising:

A. Forming a mixture of the phenolic resin and a portion of the magnesium or cadmium oxide in an organic solvent, admixing the same until dispersion is complete, and permitting the admixture to pre-react;

B. blending the polychloroprene elastomer with the remainder of the magnesium or cadmium oxides, the antioxidants, zinc oxide and asbestos fiber in a high shear mixing apparatus and then dissolving the blend in an organic solvent; and C. blending the compositions obtained from Steps A and B at a temperature below about 140°F. for a period of at least 8 hours.

2. A process according to claim 1 wherein the polychloroprene is employed in an amount of from 45 to 65 percent by weight of said composition.

3. A process according to claim 1 wherein the oxide is magnesium oxide and is employed in amounts of from 2 to 10 percent by weight.

4. A process according to claim 1 wherein the oxide employed is an admixture of magnesium and cadmium oxide in an aggregate amount of from 2 to 10 percent by weight.

5. A process according to claim 1 wherein from 30 to 100 percent of the phenolic resin employed is a high cure rate resin having thermal stability at temperatures above about 500°F.

6. A process according to claim 1 wherein the composition produced by Step C is admixed with solvents to a viscosity of from 23,000 to about 90,000 centipoises.

7. A process according to claim 1 wherein the antioxidants are dilauryl thiodipropionate and nickel dibutyl dithiocarbamate, each employed in an amount of from 0.1 to 2 percent by weight.

8. A process according to claim 1 wherein Step C is carried out at a temperature below about 120°F.

9. A process according to claim 1 wherein the composition of Step A is pre-reacted for a period of up to about 2 weeks.

* * * * *

UNITED STATES PATENT OFFICE
CERTIFICATE OF CORRECTION

Patent No. 3,843,592  Dated October 22, 1974

Inventor(s) Garry R. Perkins

It is certified that error appears in the above-identified patent and that said Letters Patent are hereby corrected as shown below:

On the first page of the patent, in the first column, for the first patent listed under the heading "References Cited", "12/1909" should be -- 12/1959 --

Column 1, line 10, delete "1."

Line 15, delete "2."

Column 2, line 28, after "percent," insert -- preferably --

Column 3, line 52, delete "and", second occurrence

Column 7, line 14, "AFG-10" should be -- AFG-01 --

Signed and sealed this 4th day of February 1975.

(SEAL)
Attest:

McCOY M. GIBSON JR.
Attesting Officer

C. MARSHALL DANN
Commissioner of Patents